(12) United States Patent
Lee et al.

(10) Patent No.: US 12,122,267 B2
(45) Date of Patent: Oct. 22, 2024

(54) DEVICE FOR RECLINING SEATBACK FOR VEHICLE

(71) Applicants: Hyundai Motor Company, Seoul (KR); Kia Corporation, Seoul (KR); Daedong Movel System Co. Ltd., Gyeonggi-do (KR); Hyundai Transys Inc., Chungcheongnam-Do (KR)

(72) Inventors: Hoon Bok Lee, Gyeonggi-do (KR); Yo Han Kim, Gyeonggi-do (KR); Deok Soo Lim, Gyeonggi-do (KR); Chan Ho Jung, Gyeonggi-do (KR); Yoon Gu Kim, Gyeonggi-do (KR); Dong Hyun Kim, Gyeonggi-do (KR); Jung Bin Lee, Gyeonggi-do (KR)

(73) Assignees: Hyundai Motor Company, Seoul (KR); Kia Corporation, Seoul (KR); Daedong Movel System Co. Ltd., Gyeonggi-do (KR); Hyundai Transys Inc., Chungcheongnam-do (KR)

( * ) Notice: Subject to any disclaimer, the term of this patent is extended or adjusted under 35 U.S.C. 154(b) by 236 days.

(21) Appl. No.: 17/869,377

(22) Filed: Jul. 20, 2022

(65) Prior Publication Data
US 2023/0045201 A1    Feb. 9, 2023

(30) Foreign Application Priority Data
Jul. 28, 2021 (KR) ........................ 10-2021-0098877

(51) Int. Cl.
*B60N 2/22*    (2006.01)
*B60N 2/02*    (2006.01)
*B60N 2/30*    (2006.01)

(52) U.S. Cl.
CPC ........... *B60N 2/22* (2013.01); *B60N 2/02246* (2023.08); *B60N 2/0228* (2013.01); *B60N 2/3009* (2013.01); *B60N 2/02253* (2023.08)

(58) Field of Classification Search
CPC ........ B60N 2/22; B60N 2/02246; B60N 2/23; B60N 2/235; B60N 2/2218; B60N 2/0228; B60N 2/3009; B60N 2/02253; B60N 2/20; B60N 2/2209
See application file for complete search history.

(56) References Cited

U.S. PATENT DOCUMENTS 6,339,302 B1 * 1/2002 Greenbank ............ B60N 2/067
                                                      318/567
6,799,801 B2 * 10/2004 Niimi ..................... B60N 2/206
                                                      297/367 R
(Continued)

FOREIGN PATENT DOCUMENTS

| JP | 2007-007386 A | 1/2007 |
| KR | 2013-0020847 A | 2/2013 |
| KR | 102048974 B1 | 11/2019 |

*Primary Examiner* — Mark R Wendell
(74) *Attorney, Agent, or Firm* — Fox Rothschild LLP

(57) ABSTRACT

The present disclosure provides a device for reclining a seatback for a vehicle, which may allow a separate actuator to be driven by a switching signal of a lever switch when a user operates the lever switch with only a small force such that a cable connected to a latch for locking or unlocking a recliner may be pulled in an unlock direction of the recliner, thereby implementing the reclining operation for adjusting an angle of the seatback in a semiautomatic manner.

10 Claims, 7 Drawing Sheets

(56) References Cited

U.S. PATENT DOCUMENTS

| | | | | |
|---|---|---|---|---|
| 6,857,702 B2* | 2/2005 | Becker | | B60N 2/20 297/341 |
| 7,017,993 B2* | 3/2006 | Niimi | | B60N 2/12 297/341 |
| 8,376,459 B2* | 2/2013 | Kumazaki | | B60N 2/2358 297/378.12 |
| 8,967,719 B2* | 3/2015 | Ngiau | | B60N 2/123 297/378.12 |
| 8,998,331 B2* | 4/2015 | Hage-Hassan | | B60N 2/20 297/344.1 |
| 9,114,732 B2* | 8/2015 | Cooley | | B60N 2/305 |
| 9,688,164 B2* | 6/2017 | Vikstrom | | B60N 2/067 |
| 9,731,630 B2* | 8/2017 | Sasaki | | B60N 2/123 |
| 9,914,431 B2* | 3/2018 | Tsunoda | | B60N 2/0244 |
| 10,065,532 B2* | 9/2018 | Ioppolo | | B60N 2/0893 |
| 10,232,745 B2* | 3/2019 | Ferre | | B60N 2/12 |
| 10,252,644 B2* | 4/2019 | Aktas | | B60N 2/20 |
| 10,286,814 B2* | 5/2019 | Ploch | | B60N 2/20 |
| 2008/0067851 A1* | 3/2008 | Tomandl | | B60N 2/305 297/341 |
| 2010/0026070 A1* | 2/2010 | Rohee | | B60N 2/123 296/65.13 |
| 2011/0133529 A1* | 6/2011 | Guerrero | | B60N 2/4279 297/344.1 |
| 2013/0200673 A1* | 8/2013 | Rdzanek | | B60N 2/02 297/313 |
| 2013/0285428 A1* | 10/2013 | Livesey | | B60N 2/12 297/317 |
| 2014/0015297 A1* | 1/2014 | Cooley | | B60N 2/3013 297/378.1 |
| 2014/0217794 A1* | 8/2014 | Emrich | | B60N 2/2252 297/337 |
| 2015/0202996 A1* | 7/2015 | Kajale | | B60N 2/206 297/363 |
| 2016/0090012 A1* | 3/2016 | Aktas | | B60N 2/12 297/378.12 |
| 2016/0159256 A1* | 6/2016 | Szlag | | B60N 2/12 297/341 |
| 2017/0291507 A1* | 10/2017 | Hattori | | B60N 2/20 |
| 2018/0037140 A1* | 2/2018 | Gollhardt | | B60N 2/20 |
| 2018/0141470 A1* | 5/2018 | Lee | | B60N 2/02253 |
| 2019/0092191 A1* | 3/2019 | Bouzid | | B60N 2/02246 |
| 2019/0381913 A1 | 12/2019 | Banales Cano et al. | | |

* cited by examiner

DEVICE FOR RECLINING SEATBACK FOR VEHICLE

CROSS-REFERENCE TO RELATED APPLICATION

This application claims under 35 U.S.C. § 119(a) the benefit of priority to Korean Patent Application No. 10-2021-0098877 filed on Jul. 28, 2021, the entire contents of which are incorporated herein by reference.

BACKGROUND

(a) Technical Field

The present disclosure relates to a device for reclining a seatback for a vehicle, and more specifically, to a device for reclining a seatback for a vehicle, which may perform a reclining operation for adjusting an angle of a seatback in a semiautomatic manner.

(b) Background Art

Generally, a seat mounted in a passenger vehicle is installed in first and second rows, seats for a van and a sport utility vehicle are installed are in the arrangement of 3 rows or more, and seats for others are installed in various arrangements.

A reclining mechanism for adjusting an angle of the seatback is applied to the seatback of the seat for the vehicle to provide comfortable seating feel to passengers, and further, a folding mechanism is applied to provide convenience of space expansion of a luggage room.

Generally, a luxury vehicle adopts the reclining and folding operations of the seatback in an electronic type, but other vehicles adopt the manual type.

Here, the conventional manual type device for reclining the seatback will be described as follows.

FIG. 1 is a schematic diagram illustrating a level position of a manual type device for reclining a seatback, and FIGS. 2A and 2B are partially enlarged cross-sectional diagrams illustrating states of pre-/post-operations of the manual type device for reclining the seatback.

As illustrated in FIG. 1, a lever 14 configured to recline a seatback is mounted on a shield cover 12 mounted on a side portion of a seat cushion 10.

Referring to FIG. 2A, the lever 14 is rotatably connected to a bracket 22 for leverage mounted on a side frame 20, and a cable connection bar 24 is integrally connected to an inner rear end of the lever 14.

Further, a latch 30 configured to lock or unlock a recliner 40 is rotatably mounted on an upper end of the side frame 20.

Since the recliner 40 is a well-known component for reclining the seatback forward or backward, a detailed description thereof will be omitted.

At this time, a cable 26 is connected between a rear end of the cable connection bar 24 and one side of the latch 30.

Referring to FIG. 2B, when a user seated on the seat rotates a front end of the lever 14 at a predetermined angle while tilting it upward, which is an unlock direction, the rear end of the lever 14 rotates downward at the same angle, and at the same time, the cable connection bar 24 connected to the inner rear end of the lever 14 pulls the cable 26 while rotating downward.

Subsequently, when the cable 26 is pulled, the latch 30 mounted on the upper end of the side frame 20 is rotated in the unlock direction to unlock the recliner 40.

Therefore, as the recliner 40 is unlocked, the recliner 40 is in a state where the seatback 50 may be reclined forward or backward.

In other words, when the user pressurizes and pushes the seatback 50 backward using the user's back in a state of continuously holding the lever 14 tilted in the unlock direction as the recliner 40 is unlocked, the seatback 50 may be reclined backward.

However, the conventional manual type device for reclining the seatback has the following problem.

When the user tilts the lever 14 in the unlock direction to unlock the recliner 40, the user is required to apply a considerable force capable of pulling the cable 26 and tilt the seatback 50, such that there is a problem in that it is difficult for the children or the handicapped and the elderly to directly operate the lever for reclining the seatback.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

The present disclosure has been made in an effort to solve the above problem associated with the related art, and an object of the present disclosure is to provide a device for reclining a seatback for a vehicle, which may allow a separate actuator to be driven by a switching signal of a lever switch when a user operates the lever switch with only a small force such that a cable connected to a latch for locking or unlocking a recliner may be pulled in an unlock direction of the recliner, thereby implementing the reclining operation for adjusting an angle of the seatback in a semiautomatic manner.

To achieve the object, the present disclosure provides a device for reclining the seatback for a vehicle configured to include a lever switch mounted on a seat cushion for reclining a seatback; an actuator mounted on a lower portion of the seat cushion; a latch rotatably mounted on a side frame for locking or unlocking a recliner; a cable connected between an output shaft of the actuator and the latch; and a controller configured to apply a drive signal for pulling the cable to the actuator to rotate the latch in an unlock direction of the recliner when receiving a switching signal of the lever switch.

Preferably, the controller and the actuator are provided in one coupled structure and mounted on the lower portion of the seat cushion.

In particular, the controller is configured to apply the drive signal for pulling the cable to the actuator during a time when receiving the switching signal of the lever switch whereas the controller is configured to control the drive signal applied to the actuator to be interrupted when not receiving the switching signal of the lever switch.

Further, a folding switch is further mounted at a position next to the lever switch on an outer portion of the seat cushion.

Preferably, the lever switch and the folding switch are mounted on a shield cover mounted on the outer portion of the seat cushion.

Further, a switch circuit board connected to the lever switch and the folding switch to transmit either the switching signal of the lever switch or a switching signal of the folding switch to the controller is mounted on an inner portion of the seat cushion.

Further, a signal delivery wiring is connected between the switch circuit board and the controller.

Further, the controller is configured to apply the drive signal for pulling the cable to the actuator for a preset time when receiving the switching signal of the folding switch, and to control the drive signal applied to the actuator to be interrupted when the preset time is exceeded.

Through the above configuration, the present disclosure provides the following effects.

First, it is possible to allow the separate actuator to pull the cable in the unlock direction of the recliner when the user switches the lever switch for reclining the seatback with the small force, thereby implementing the reclining operation for adjusting the angle of the seatback in the semiautomatic manner.

Second, while the user conventionally performs the operation of applying the considerable force capable of pulling the cable to the lever for reclining the seatback and tilting the lever, according to the present disclosure, the separate actuator instead of the user pulls the cable in the unlock direction of the recliner, such that the children or the handicapped and the elderly may easily implement the reclining 자세 of the seatback with only the simple operation of the lever switch.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
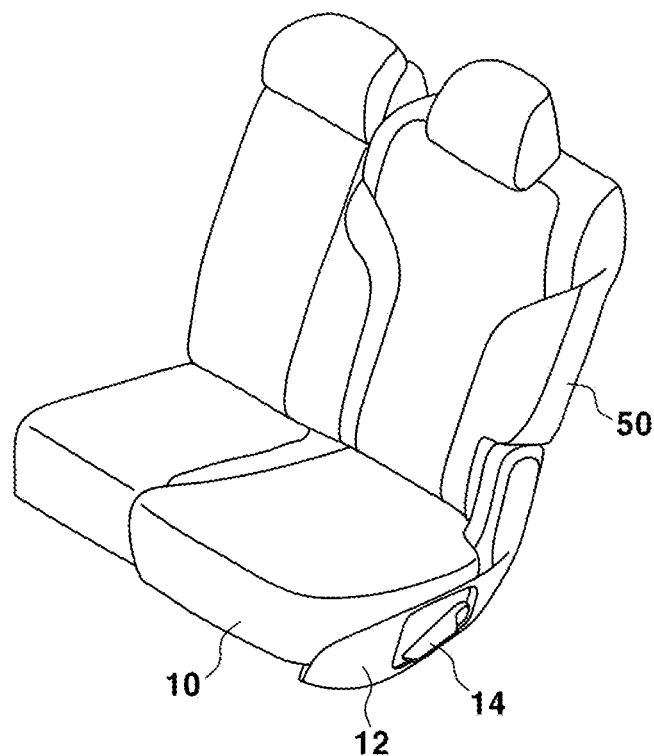
FIG. 1 is a schematic diagram illustrating a position of a lever of a manual type device for reclining a seatback.
Figure 2A:
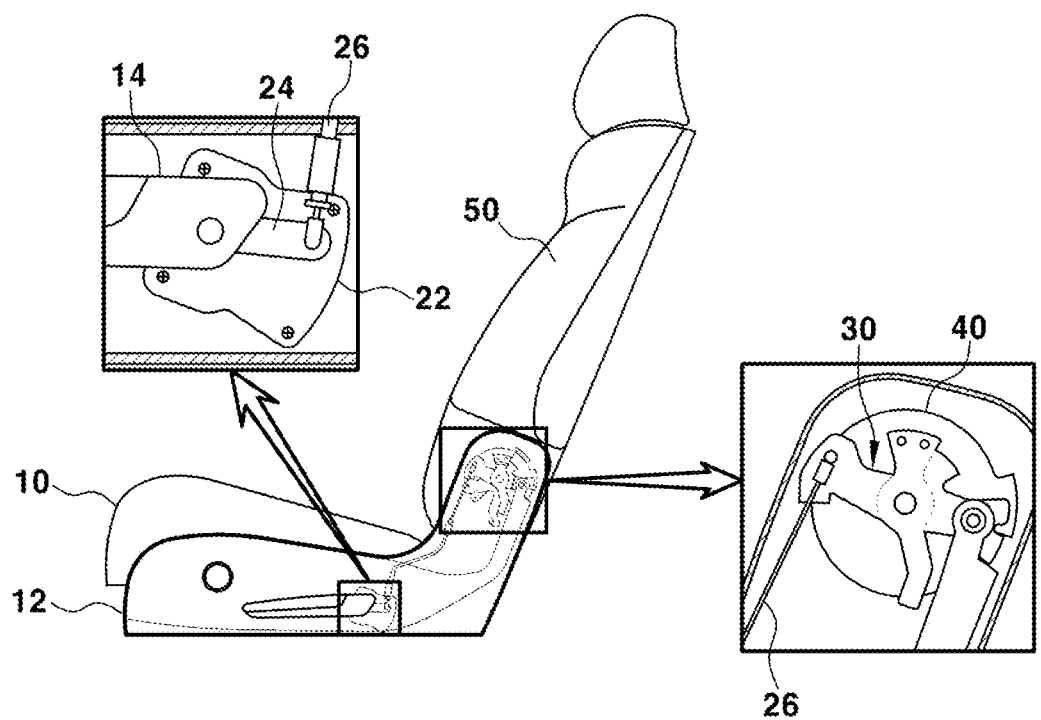
FIGS. 2A and 2B are partially enlarged cross-sectional diagrams illustrating states of pre-/post-operations of the manual type device for reclining the seatback.
Figure 2B:
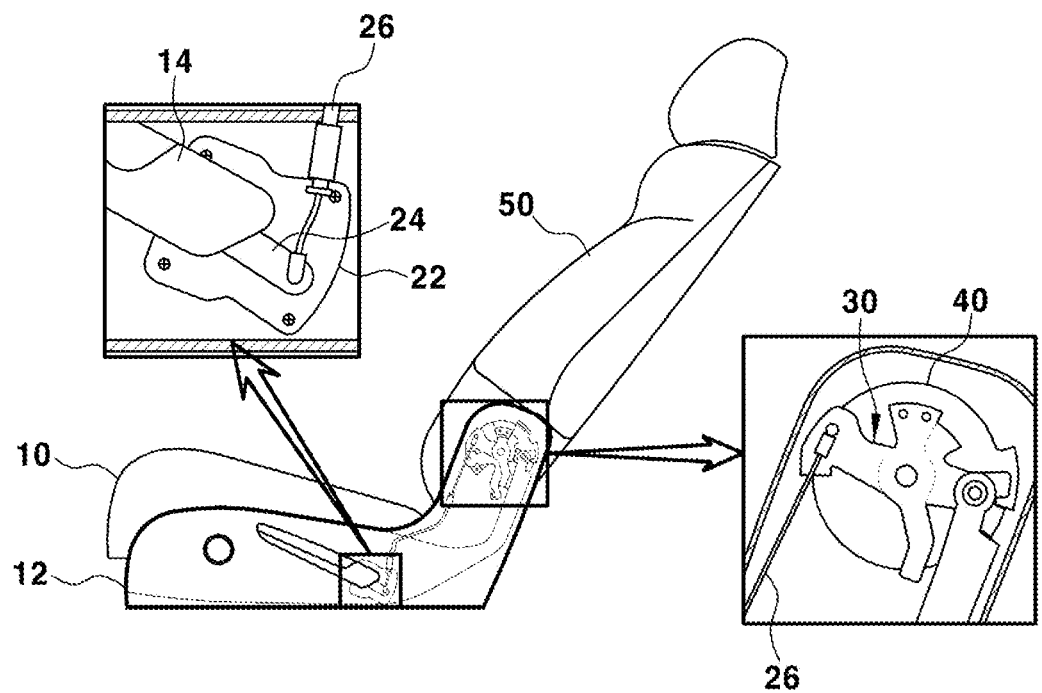

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, a preferred exemplary embodiment of the present disclosure will be described in detail with reference to the accompanying drawings.

Figure 3:
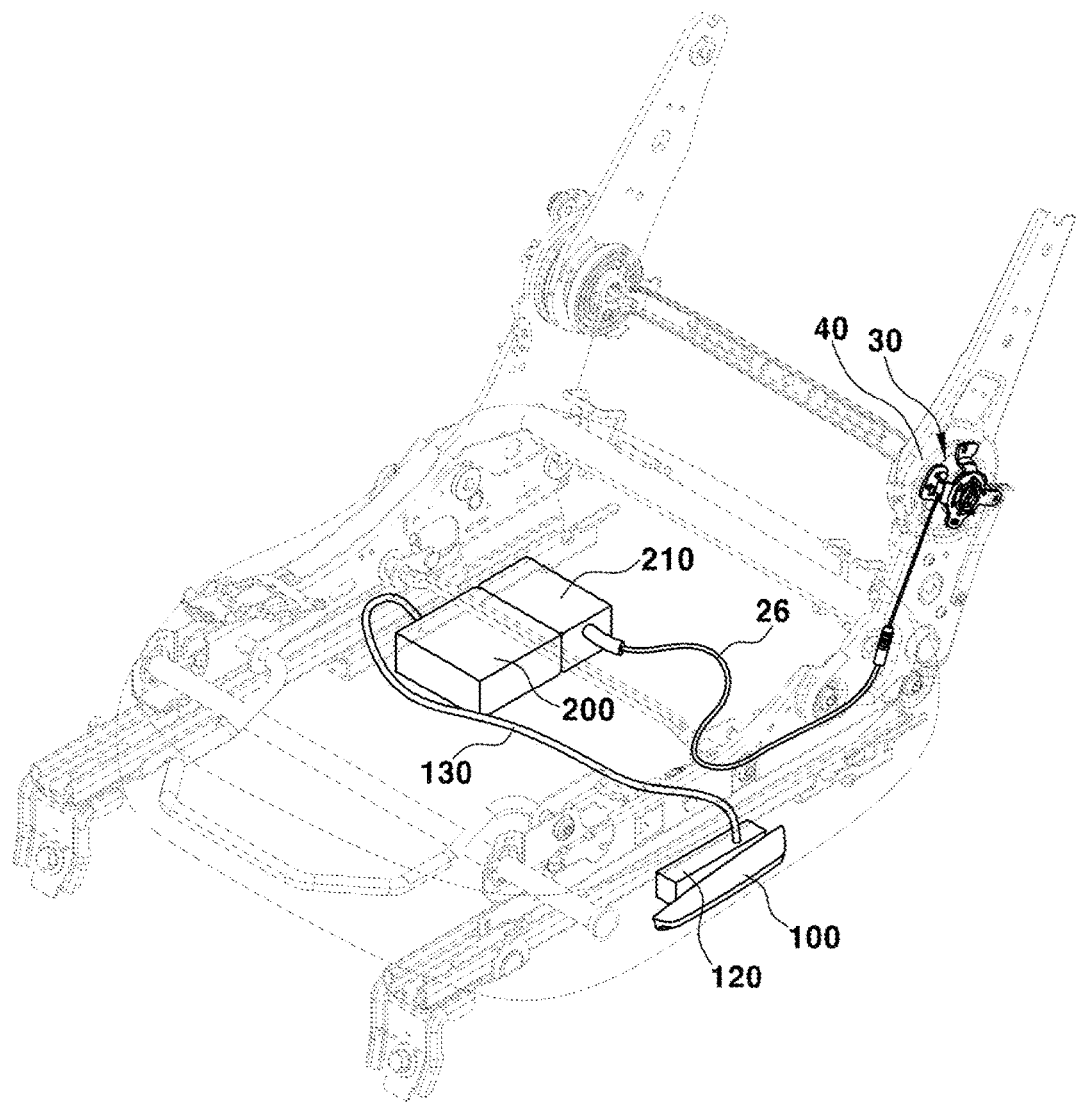
FIG. 3 is a perspective diagram illustrating a device for reclining a seatback for a vehicle according to the present disclosure.
Figure 4:
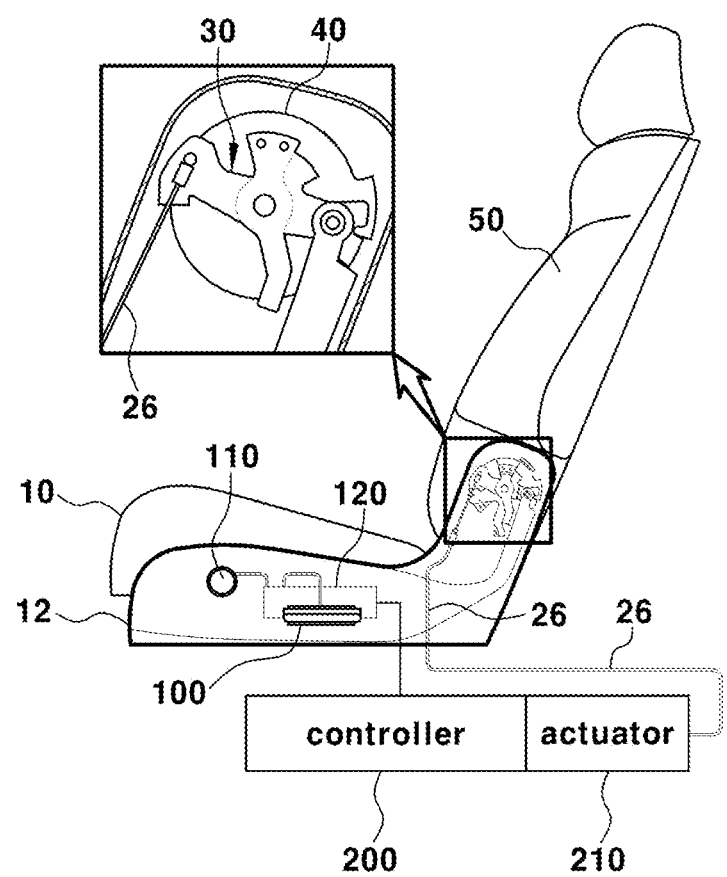
FIG. 4 is a side cross-sectional diagram illustrating a configuration of the device for reclining the seatback for the vehicle according to the present disclosure.

FIG. 3 is a perspective diagram illustrating a device for reclining a seatback for a vehicle according to the present disclosure, and FIG. 4 is a schematic side cross-sectional diagram illustrating a configuration of the device for reclining the seatback for the vehicle according to the present disclosure.

As illustrated in FIG. 3, a lever switch 100 for reclining a seatback is mounted on a seat cushion 10, and the lever switch 100 may be mounted at various positions of the seat cushion and the seatback depending upon the vehicle model and the type of seat other than an outer portion of the seat cushion 10.

Preferably, the lever switch 100 is mounted on a shield cover 12 configured to cover a side portion of the seat cushion to be able to perform a tilting operation and a push operation.

Referring to FIG. 4, a latch 30 configured to lock or unlock the recliner 40 is rotatably mounted on an upper end of a side frame 20 positioned inside the shield cover 12.

Since the recliner 40 is a well-known component for performing the reclining operation forward or backward, a detailed description thereof will be omitted.

For reference, the seatback is maintained in a state of being fixed when the recliner 40 is locked, whereas if the seatback is pressurized backward when the recliner 40 is unlocked, the seatback is reclined backward, and further, the seatback may be folded forward by an elastic restoring force of a spring included in the recliner 40 unless a pressurization force is applied to the seatback when the recliner 40 is unlocked.

In particular, an actuator 210 is mounted on a lower portion of the seat cushion 10, and the actuator 210 is operated by a drive signal instruction of a controller 200.

Preferably, the controller 200 and the actuator 210 are provided in one coupled structure, and a seat cushion frame or the like that exists on the lower portion of the seat cushion 10 is fixed and mounted thereon.

At this time, a cable 26 is connected between an output shaft of the actuator 210 and the latch 30.

Therefore, when the output shaft is pulled by applying an electrical signal to the actuator 210, the latch 30 rotates in an unlock direction of the recliner 40 as the cable 26 is pulled.

More specifically, when receiving a switching signal of the lever switch 100, the controller 200 applies a drive signal for pulling the cable 26 to the actuator 210, and therefore, the latch 30 rotates in the unlock direction of the recliner 40 as the cable 26 is pulled.

Meanwhile, a folding switch 110 is further mounted at a position next to the lever switch 100 on an outer portion of the seat cushion 10.

Preferably, the folding switch 110 is mounted at a front position of the lever switch 100 on the shield cover 12 configured to cover the side portion of the seat cushion to be able to perform a push operation.

Further, a switch circuit board 120 connected to the lever switch 100 and the folding switch 110 to identify and recognize the electrical switching signals of the lever switch 100 and the folding switch 110 is mounted on an inner portion of the seat cushion 10, that is, an inner portion of the shield cover 12.

Preferably, the switch circuit board 120 may be embedded in a case for protection thereof.

The switch circuit board 120 serves to transmit one of the switching signal of the lever switch 100 and the switching signal of the folding switch 110 to the controller 200, and to this end, a signal delivery wiring 130 is connected between the switch circuit board 120 and the controller 200.

Here, an operation flow of the device for reclining the seatback according to the present disclosure having the above configuration will be described as follows.

Operation of Reclining the Seatback

Figure 5:
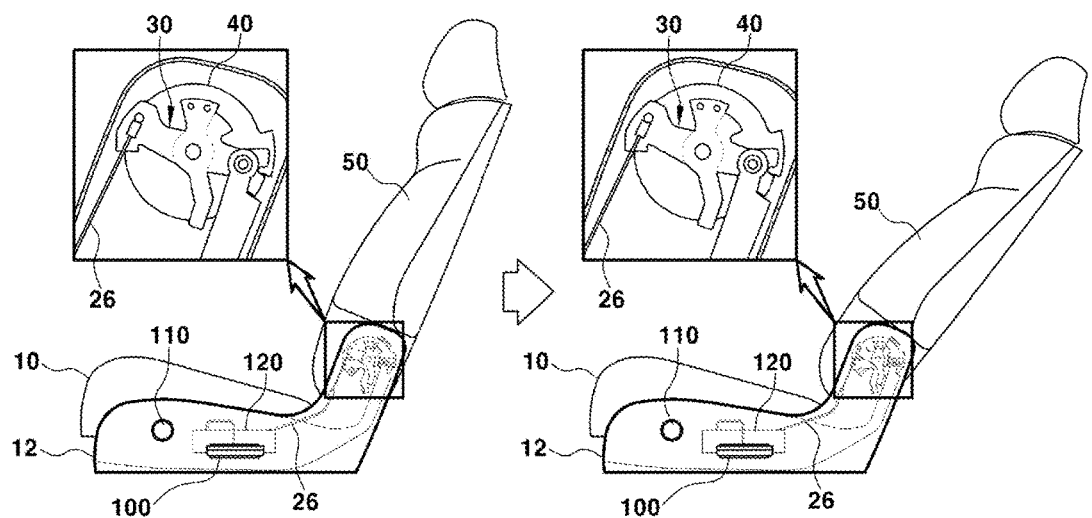
FIGS. 5 and 6 are side diagrams illustrating that the seatback is reclined upon operation of a lever switch of the device for reclining the seatback for the vehicle according to the present disclosure.
Figure 6:
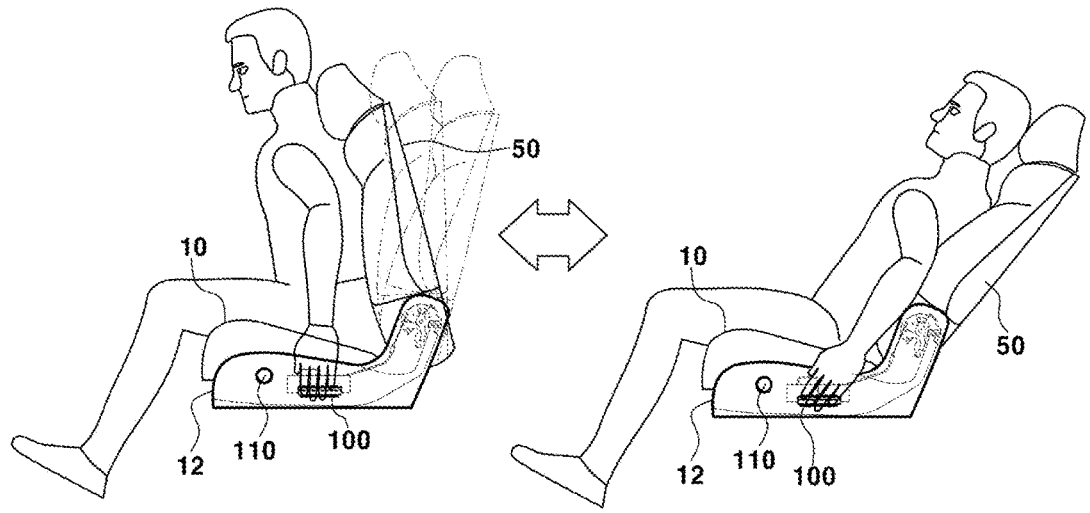

FIGS. 5 and 6 are side diagrams illustrating that the seatback is reclined upon operation of a lever switch of the device for reclining the seatback for the vehicle according to the present disclosure.

First, a user seated on the seat presses the lever switch 100 or performs a tilting operation.

At this time, the switch circuit board 120 recognizes the switching signal according to the operation of the lever switch 100 and transmits the switching signal of the lever switch 100 to the controller 100.

Subsequently, when receiving the switching signal of the lever switch 100, the controller 200 applies the drive signal for pulling the cable 26 to the actuator 210.

Subsequently, the output shaft of the actuator 210 pulls the cable 26 while being driven backward, and at the same time, the latch 30 is rotated in the unlock direction of the recliner 40 as the cable 26 is pulled.

At this time, the controller 200 is configured to perform a control of continuously applying the electrical drive signal for pulling the cable 26 to the actuator 210 during a time when the switching signal of the lever switch 100 is received.

Therefore, while the user continuously presses the lever switch 100 or maintains the tilting switching operation state, the state where the cable 26 is pulled is maintained while the output shaft of the actuator 210 maintains the state of being driven backward, and the latch 30 is maintained in the state of being rotated in the unlock direction of the recliner 40.

Therefore, as described above, in the state where the recliner 40 is unlocked, as illustrated in FIG. 5, the user seated on the seat may pressurize and push the seatback 50 using his/her back up to a rear desired position, thereby reclining the seatback backward.

Of course, as described above, when the pressurization force to the seatback 50 is released in the state where the recliner 40 is unlocked, the seatback 50 may be reclined forward by the elastic restoring force of the spring included in the recliner 40.

At this time, when the user seated on the seat releases the operation of the lever switch 100, the switching signal of the lever switch 100 is not transmitted to the controller 200 anymore.

Therefore, when not receiving the switching signal of the lever switch 100, the controller 200 performs a control of interrupting the drive signal applied to the actuator 210, and therefore, the force of pulling the cable 26 may be released.

Further, when the force of pulling the cable 26 is released, the latch 30 is in the state of being rotated back in the lock direction of the recliner 40 by the elastic restoring force of a return spring (not illustrated), and therefore, the seatback is in the state of being fixed to the desired position.

As described above, while the user conventionally applies the considerable force capable of pulling the cable to the lever for reclining the seatback and tilts the lever, according to the present disclosure, the separate actuator 210 instead of the user may pull the cable 26 in the unlock direction of the recliner 40, thereby allowing the children or the handicapped and the elderly to easily implement the reclining posture of the seatback with only the simple operation of the lever switch.

Operation of Folding the Seatback

Figure 7:
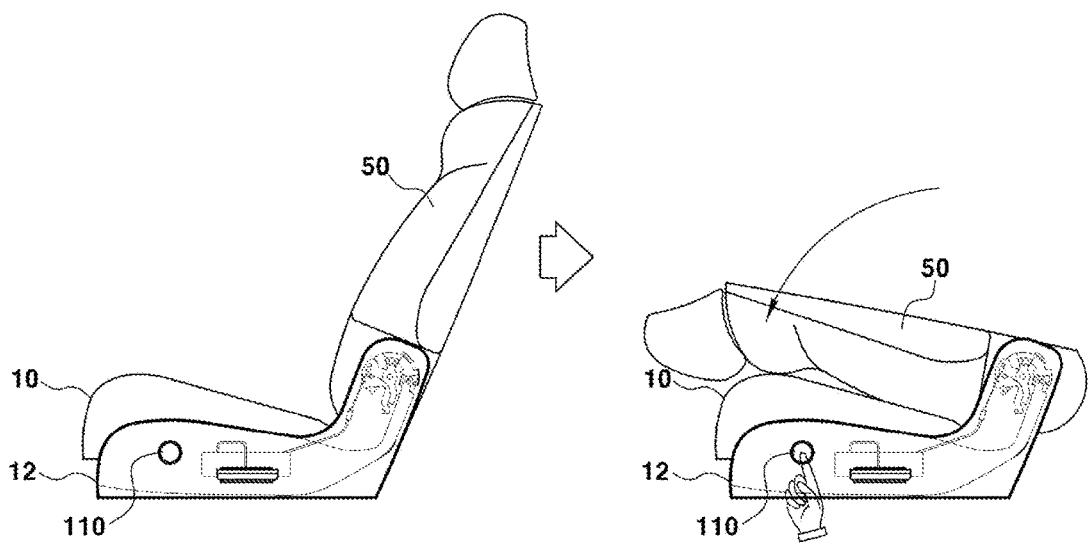
FIG. 7 is a side diagram illustrating that the seatback is folded upon operation of a folding switch of the device for reclining the seatback for the vehicle according to the present disclosure.

FIG. 7 is a side diagram illustrating that the seatback is folded upon operation of a folding switch of the device for reclining the seatback for the vehicle according to the present disclosure.

To secure the storage space and area of a luggage room of the vehicle, the seatback of the second row seat or the third row seat may be folded.

To this end, the user presses the folding switch 110 in the state of being not seated on the seat.

At this time, the switch circuit board 120 recognizes the switching signal according to the operation of the folding switch 110 and transmits the switching signal of the folding switch 110 to the controller 100.

Subsequently, when receiving the switching signal of the folding switch 110, the controller 200 applies the drive signal for pulling the cable 26 to the actuator 210.

Subsequently, the output shaft of the actuator 210 pulls the cable 26 while being driven backward, and at the same time, the latch 30 is rotated in the unlock direction of the recliner 40 as the cable 26 is pulled.

At this time, when receiving the switching signal of the folding switch 110, the controller 200 controls the drive signal for pulling the cable 26 to be applied to the actuator 210 for a preset time.

Preferably, the preset time is a time when the seatback 50 closely contacts the seat cushion 10 and is completely folded, and may be set as about 1 second.

Therefore, as described above, in the state where the recliner 40 is unlocked, as illustrated in FIG. 6, the seatback 50 may closely contact the seat cushion 10 and be folded by the elastic restoring force of the spring included in the recliner 40.

Subsequently, when the preset time is exceeded (e.g., about 1.5 seconds), the controller 200 controls the drive signal applied to the actuator 210 to be interrupted, and therefore, the force of pulling the cable 26 may be released, and the latch 30 is rotated back in the lock direction of the recliner 40 by the elastic restoring force of the return spring (not illustrated), and therefore, the seatback is in the state of being fixed to the folded position.

As described above, when the user presses the folding switch, it is possible to allow the separate actuator to pull the cable in the unlock direction of the recliner, thereby easily folding the seatback in the semiautomatic manner as well.

On the other hand, the controller 200 may be configured, during power cutoffs such as a battery failure, a blown fuse, etc., to provide emergency power to the actuator 210 so that the actuator 210 can operate to lock or unlock the recliner 40.

Thus, even during power failures, the controller 200 provides emergency power so that the actuator 210 can operate to lock or unlock the recliner 40.

While the present disclosure has been described above in detail as one exemplary embodiment, the scope of the present disclosure is not limited to the aforementioned one exemplary embodiment, and various modifications and improvements made by those skilled in the art using the basic concept of the present disclosure defined in the appended claims are also included in the scope of the present disclosure.

What is claimed is:

1. A device for reclining the seatback for a vehicle comprising:
   a lever switch mounted on a seat cushion for reclining a seatback;
   an actuator mounted on a lower portion of the seat cushion;
   a latch rotatably mounted on a side frame for locking or unlocking a recliner;
   a cable connected between an output shaft of the actuator and the latch; and
   a controller configured to:
      apply a drive signal for pulling the cable to the actuator to rotate the latch in an unlock direction of the recliner when receiving a switching signal of the lever switch; and
      during power cutoffs, to provide emergency power to the actuator so that the actuator can operate to lock or unlock the recliner without interruption.

2. The device for reclining the seatback of claim 1, wherein the controller and the actuator are provided in one coupled structure and mounted on the lower portion of the seat cushion.

3. The device for reclining the seatback of claim 1, wherein the controller is configured to apply the drive signal for pulling the cable to the actuator during a time when receiving the switching signal of the lever switch.

4. The device for reclining the seatback of claim 3, wherein the controller is configured to control the drive signal applied to the actuator to be interrupted when not receiving the switching signal of the lever switch.

5. The device for reclining the seatback of claim 1, wherein a folding switch is further mounted at a position next to the lever switch on an outer portion of the seat cushion.

6. The device for reclining the seatback of claim 5, wherein the lever switch and the folding switch are mounted on a shield cover mounted on the outer portion of the seat cushion.

7. The device for reclining the seatback of claim 5, wherein a switch circuit board connected to the lever switch and the folding switch to transmit either the switching signal of the lever switch or a switching signal of the folding switch to the controller is mounted on an inner portion of the seat cushion.

8. The device for reclining the seatback of claim 7, wherein a signal delivery wiring is connected between the switch circuit board and the controller.

9. The device for reclining the seatback of claim 7, wherein the controller is configured to apply the drive signal for pulling the cable to the actuator for a preset time when receiving the switching signal of the folding switch.

10. The device for reclining the seatback of claim 9, wherein the controller is configured to control the drive signal applied to the actuator to be interrupted when the preset time is exceeded.

* * * * *